United States Patent
Strohl et al.

(10) Patent No.: US 11,131,200 B2
(45) Date of Patent: Sep. 28, 2021

(54) METHOD AND APPARATUS FOR IMPROVING TURBINE BLADE SEALING IN A GAS TURBINE ENGINE

(71) Applicant: Chromalloy Gas Turbine LLC, Palm Beach Gardens, FL (US)

(72) Inventors: James Page Strohl, Stuart, FL (US); Paul Herber, Royal Palm Beach, FL (US); Nate Hardegree, Palm City, FL (US)

(73) Assignee: Chromalloy Gas Turbine LLC, Palm Beach Gardens, FL (US)

(*) Notice: Subject to any disclaimer, the term of this patent is extended or adjusted under 35 U.S.C. 154(b) by 160 days.

(21) Appl. No.: 16/173,714

(22) Filed: Oct. 29, 2018

(65) Prior Publication Data

US 2020/0131915 A1 Apr. 30, 2020

(51) Int. Cl.
| | |
|---|---|
| *F01D 5/20* | (2006.01) |
| *F01D 5/18* | (2006.01) |
| *F01D 11/08* | (2006.01) |
| *B23P 15/04* | (2006.01) |
| *B33Y 80/00* | (2015.01) |

(52) U.S. Cl.
CPC ............... *F01D 5/20* (2013.01); *F01D 5/187* (2013.01); *F01D 11/08* (2013.01); *B23P 15/04* (2013.01); *B33Y 80/00* (2014.12); *F05D 2230/12* (2013.01); *F05D 2230/21* (2013.01); *F05D 2230/237* (2013.01); *F05D 2230/30* (2013.01); *F05D 2240/307* (2013.01); *F05D 2260/20* (2013.01)

(58) Field of Classification Search
CPC . F01D 5/20; F01D 5/187; F01D 11/08; B33Y 80/00; B23P 15/04; F05D 2230/12; F05D 2230/21; F05D 2230/23; F05D 2230/30; F05D 2240/307; F05D 2260/20
See application file for complete search history.

(56) References Cited

U.S. PATENT DOCUMENTS

| | | | | |
|---|---|---|---|---|
| 3,846,899 A | * | 11/1974 | Gross | ....................... F01D 11/02 29/402.02 |
| 3,854,842 A | * | 12/1974 | Caudill | ..................... F01D 5/18 415/116 |
| 5,234,318 A | * | 8/1993 | Brandon | .................. F01D 11/08 415/170.1 |
| 6,491,498 B1 | * | 12/2002 | Seleski | ................... F01D 5/147 415/173.4 |
| 7,695,248 B2 | * | 4/2010 | Mons | ................... B23K 26/147 416/97 R |

(Continued)

FOREIGN PATENT DOCUMENTS

WO WO-2017020178 A1 * 2/2017 ............. F01D 5/225

*Primary Examiner* — Igor Kershteyn
*Assistant Examiner* — Joshua R Beebe
(74) *Attorney, Agent, or Firm* — Avant Law Group, LLC

(57) ABSTRACT

A system and method for improving sealing at a turbine blade tip shroud, while reducing weight associated with the improved sealing is disclosed. The gas turbine blade incorporates a tip shroud having one or more pockets located therein, where the one or more pockets remove weight from the shroud, thus reducing load on the blade attachment generated by additional sealing at the turbine blade shroud. Methods for incorporating the one or more tip shrouds in a new turbine blade or a repaired turbine blade are also disclosed.

13 Claims, 8 Drawing Sheets

(56) References Cited

U.S. PATENT DOCUMENTS

| | | | | |
|---|---|---|---|---|
| 8,047,793 B2* | 11/2011 | Baumas | ............... | F01D 5/147 |
| | | | | 416/191 |
| 8,192,166 B2* | 6/2012 | Beeck | ............... | F01D 11/08 |
| | | | | 415/173.6 |
| 2005/0274009 A1* | 12/2005 | Powers | ............... | B23P 6/005 |
| | | | | 29/889.1 |
| 2007/0134096 A1* | 6/2007 | Mons | ............... | B22F 3/1055 |
| | | | | 416/97 R |
| 2009/0123288 A1* | 5/2009 | Baumas | ............... | F01D 5/225 |
| | | | | 416/219 R |
| 2010/0290897 A1* | 11/2010 | Beeck | ............... | F01D 11/08 |
| | | | | 415/173.1 |
| 2011/0206501 A1* | 8/2011 | Bergman | ............... | F01D 11/005 |
| | | | | 415/177 |
| 2017/0183971 A1* | 6/2017 | McDufford | ............... | F01D 5/181 |
| 2018/0223674 A1* | 8/2018 | Taylor | ............... | F01D 5/20 |

\* cited by examiner

FIG. 1 – Prior Art

METHOD AND APPARATUS FOR IMPROVING TURBINE BLADE SEALING IN A GAS TURBINE ENGINE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This disclosure relates generally to a system and process for improving sealing between a turbine blade tip and a surrounding engine case, as well as for reducing blade weight and centrifugal pull on a blade disk. More specifically, embodiments of the present disclosure relate to providing a pocket in at least a portion of a blade tip shroud for reducing blade weight and corresponding load on the blade disk.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure increases as it passes through subsequent stages of the compressor. The compressed air is then directed to one or more combustors where it is mixed with a fuel source to create a combustible mixture. This mixture is ignited in the combustors to create a flow of hot combustion gases. These gases are directed into the turbine, causing the turbine to rotate, thereby driving the compressor. The output of the gas turbine engine can be mechanical thrust through exhaust from the turbine or shaft power from the rotation of an axial shaft, where the axial shaft can drive a generator to produce electricity.

The compressor and turbine each comprise alternating stages of rotating blades and stationary vanes having an airfoil extending into the flow of compressed air or flow of hot combustion gases. Each blade or vane has a particular set of design criteria which must be met in order to provide the necessary work to the passing flow through the compressor and the turbine. However, due to the severe nature of the operating environments, especially prevalent in the turbine, it is often necessary to cool the turbine components. A representative turbine blade in accordance with the prior art is shown in FIG. 1. This blade 100 includes an airfoil 102 having a plurality of cooling passages 104.

Depending on the size and location of the turbine blade, many turbine blades also include a shroud. The shroud is often located at a tip of the blade and extends circumferentially from the blade tip. The shroud is sized to contact a shroud of an adjacent blade in order to dampen any vibrations as well as to serve as a radially outermost point of the flow path of the turbine stage. Referring back to FIG. 1, the turbine blade 100 also includes a tip shroud 106.

Extending radially outward from the shroud 106 can be a knife edge 108. The knife edge 108 is a generally vertical wall portion extending towards a shroud block or ring segment in the engine case (not shown). The knife edge 108 operates in close proximity to the shroud block or ring segment in order to form a seal in the gap between the rotating turbine blade and surrounding shroud block.

While shroud blocks and blades with knife edges provide a seal in the gap between the blade and a surrounding shroud block, shrouds are also a source of extra weight and cause the center of gravity of the turbine blade to move radially outward, thus creating additional load on the blade attachment when the blade rotates.

BRIEF SUMMARY OF THE DISCLOSURE

The present disclosure relates to a method and apparatus for improving sealing at a blade tip while also compensating for weight and blade pull on a turbine disk.

In an embodiment of the present disclosure, a method for reducing the weight of a turbine blade and improving sealing of a blade tip region is disclosed. In the method, a turbine blade is provided having an airfoil, a tip shroud, and a knife edge extending radially outward from the tip shroud. Material in the form of an additional knife edge is added to the tip shroud. A pocket is placed in at least a portion of the tip shroud in order to remove excess material from the tip shroud, where at least a portion of the weight of the additional knife edge is removed by the pocket.

In an alternate embodiment of the present disclosure, a gas turbine blade is disclosed having an attachment, a platform extending radially outward from the attachment, an airfoil extending radially outward from the platform, and a tip shroud extending circumferentially from the airfoil. The tip shroud has one or more knife edges extending radially outward from an outer surface of the tip shroud. The tip shroud further comprises one or more pockets extending from an outer surface of the tip shroud and towards the airfoil, where the one or more pockets remove weight from the tip shroud.

In yet another embodiment of the present disclosure, a method of modifying a turbine blade to reduce airflow passing around a blade tip is disclosed. The method comprises forming at least one additional knife edge extending radially outward from a tip shroud, where the at least one additional knife edge is added to the tip shroud in a subsequent manufacturing process. The method also provides ways of forming the at least one additional knife edge.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION OF THE DISCLOSURE

Embodiments of the present disclosure are intended for use in a gas turbine engine, such as a gas turbine used for aircraft engines and/or power generation. As such, the present embodiments are capable of being used in a variety of turbine operating environments, regardless of the manufacturer.

As those skilled in the art will readily appreciate, a gas turbine engine incorporating the present disclosure is circumferentially disposed about an engine centerline, or axial centerline axis. The engine includes a compressor, a combustion section and a turbine where the turbine is coupled to the compressor via an engine shaft. As is well known in the art, air compressed in the compressor is mixed with fuel, and the mixture is burned in the combustion section and expanded in the turbine. The air compressed in the compressor and the fuel mixture expanded in the turbine can both be referred to as a "hot gas stream flow." The turbine includes a series of blades coupled to one or more rotors that, in response to the fluid expansion, rotate, thereby driving the compressor. The turbine comprises alternating rows of rotating turbine blades, and static airfoils, often referred to as vanes. The hot gas stream flow exiting the gas turbine engine can provide thrust for an aircraft or used in a subsequent power generation process, such as steam generation, in a combined cycle power plant.

Gas turbine blades are secured in a disk by a corresponding blade attachment and disk broach slot. The disk and blade combination rotate about a centerline axis of the engine, where the blades rotate at a very high rate of speed. As the blades rotate at this rate, centrifugal forces cause the weight of the blade to "pull" on the attachment surfaces of the disk in which the blade is contained, thus imparting a load on the contact surfaces of the blade and disk, resulting in high mechanical stresses in this contact area. Therefore, blade weight must be considered in order to not overload the disk and risk a blade failure.

Figure 1:
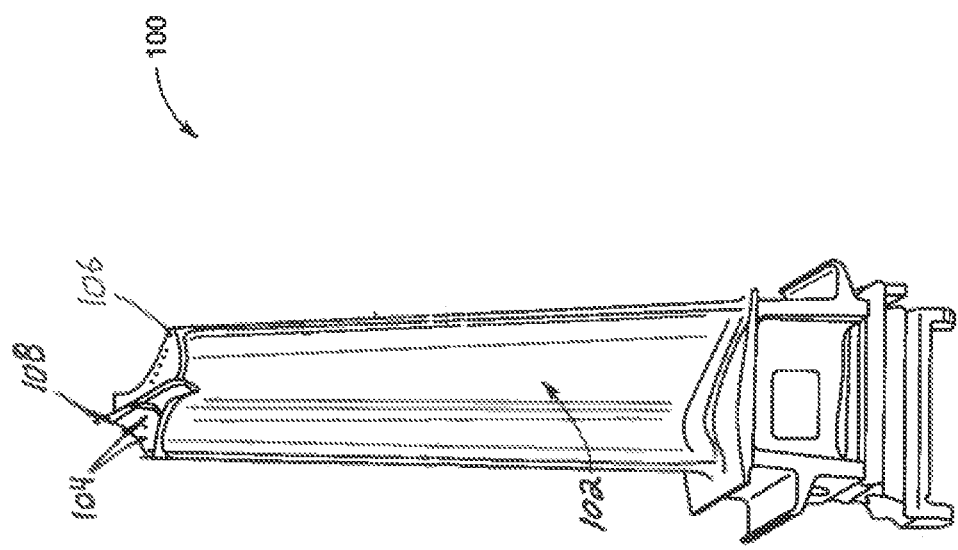
FIG. 1 is a perspective view of a gas turbine blade in accordance with the prior art.
Figure 2:
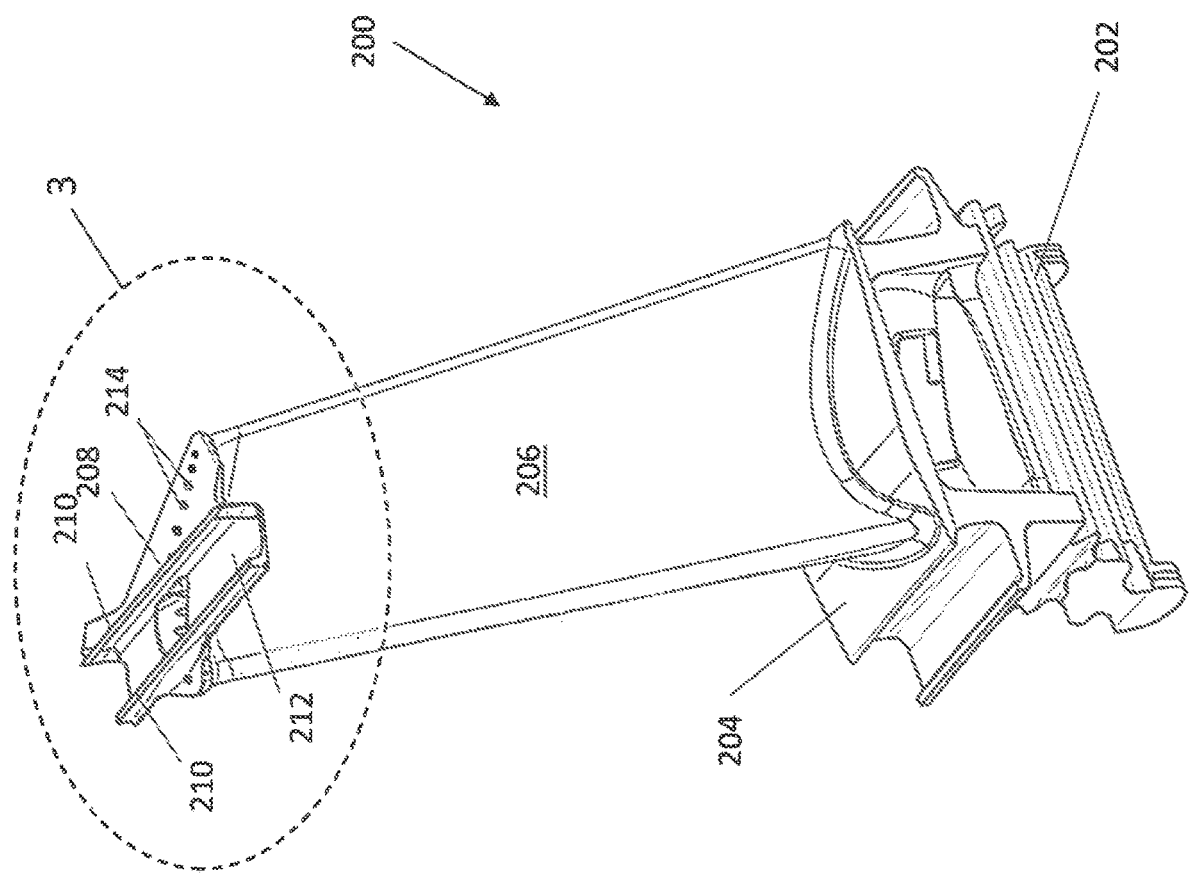
FIG. 2 is a perspective view of a gas turbine blade in accordance with an embodiment of the present disclosure.

Referring now to FIGS. 2-7, various embodiments of the present disclosure are depicted. FIG. 2 depicts a turbine blade 200 in accordance with an embodiment of the present disclosure. The turbine blade 200 comprises a blade attachment 202 and a platform 204 extending radially outward from the attachment 202. The blade attachment 202 and platform 204 regions are conventional in nature, as is well known to those of ordinary skill in the art.

The turbine blade 200 also comprises an airfoil 206 extending radially outward from the platform 204 and a tip shroud 208 extending circumferentially from the airfoil 206. The tip shroud 208 has one or more knife edges 210 extending radially outward from an outer surface 212 of the tip shroud 208.

Depending on the operating temperatures of the turbine, the turbine blade 200 may also be cooled. In an embodiment of the present disclosure, one or more cooling passages 214 extend through the airfoil 206 and to the tip shroud 208. For the embodiment of the present disclosure depicted in FIGS. 2-6, the cooling passages 214 comprise a plurality of stem drilled cooling holes, which as one skilled in the art understands, are a plurality of generally radially extending cooling holes drilled after the turbine blade is cast. The one or more cooling passages 214 may also include internal cooling enhancements to turbulate the flow of cooling air in order to improve the heat transfer and cooling efficiency. In an alternate embodiment of the present disclosure, the one or more cooling passages 214 comprises at least one cast airfoil cooling passageway. The cast airfoil cooling passageway can take on a variety of shapes and sizes depending on the cooling requirements of the turbine blade. The present disclosure can be used with or without the one or more cooling passages 214.

Referring now to FIGS. 3-6, the turbine blade 200 also comprises one or more pockets 216 in the tip shroud 208, where the one or more pockets 216 extend generally radially inward from the outer surface 212 of the tip shroud 208 towards the airfoil 206, and in some embodiments, into a portion of the airfoil 206. The pocket 216 is configured to remove excess weight from the gas turbine blade 200, thereby reducing pull on the blade attachment 202. Weight removed via the one or more pockets 216 is taken from areas of the tip shroud 208 and airfoil 206 without compromising the structural integrity of the shroud to airfoil interface 207. Weight is preferably removed from the tip shroud 208, as the amount of pull or load applied to a blade attachment is a function of the distance the weight is located from the engine centerline and the rotational speed of the turbine blade. Therefore, weight removed from the blade tip, such as in the tip shroud 208 will provide a greater contribution to attachment stress reduction than weight removed from other parts on the blade 200, such as the platform 204.

Figure 4:
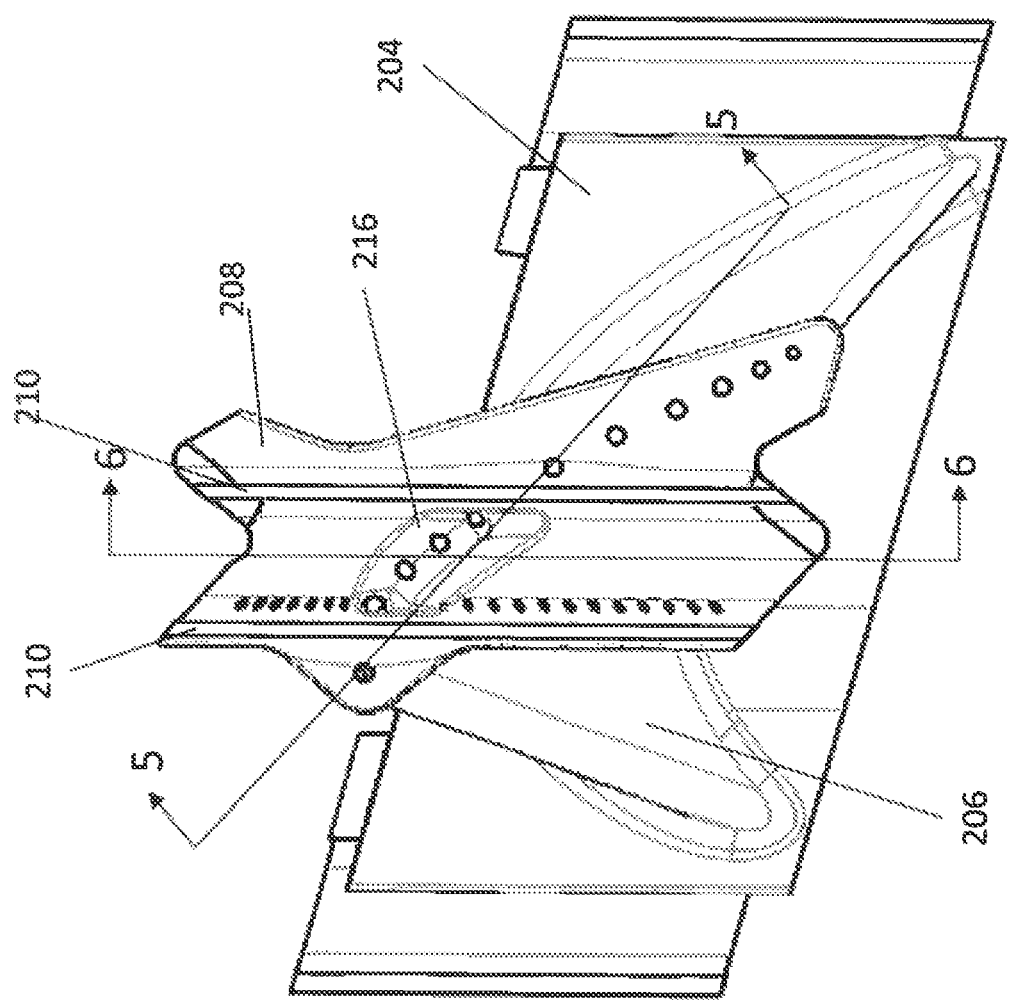
FIG. 4 is a top elevation view of the gas turbine blade of FIG. 2.
Figure 5:
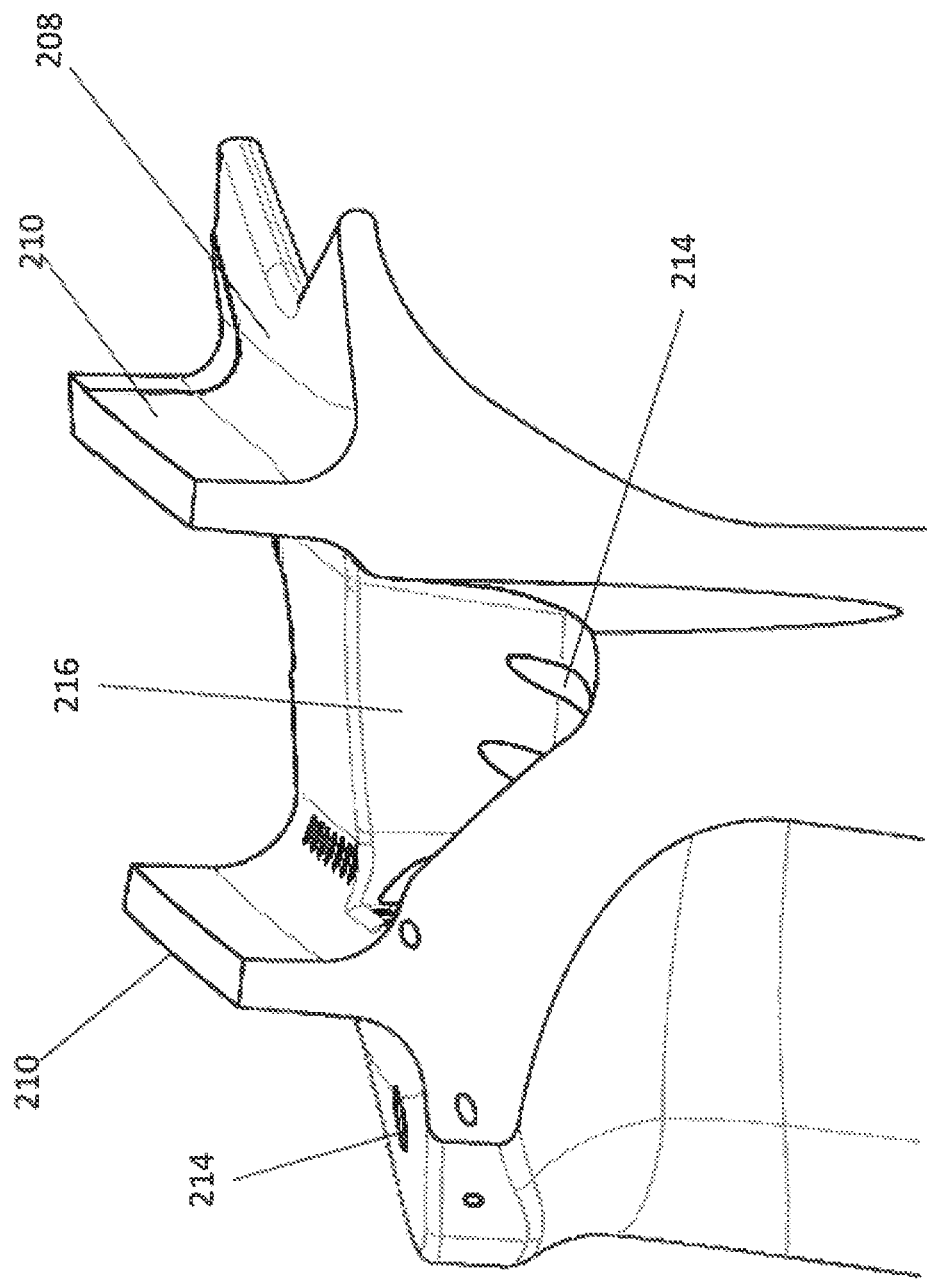
FIG. 5 is a cross section view of the gas turbine blade of FIG. 4.
Figure 6:
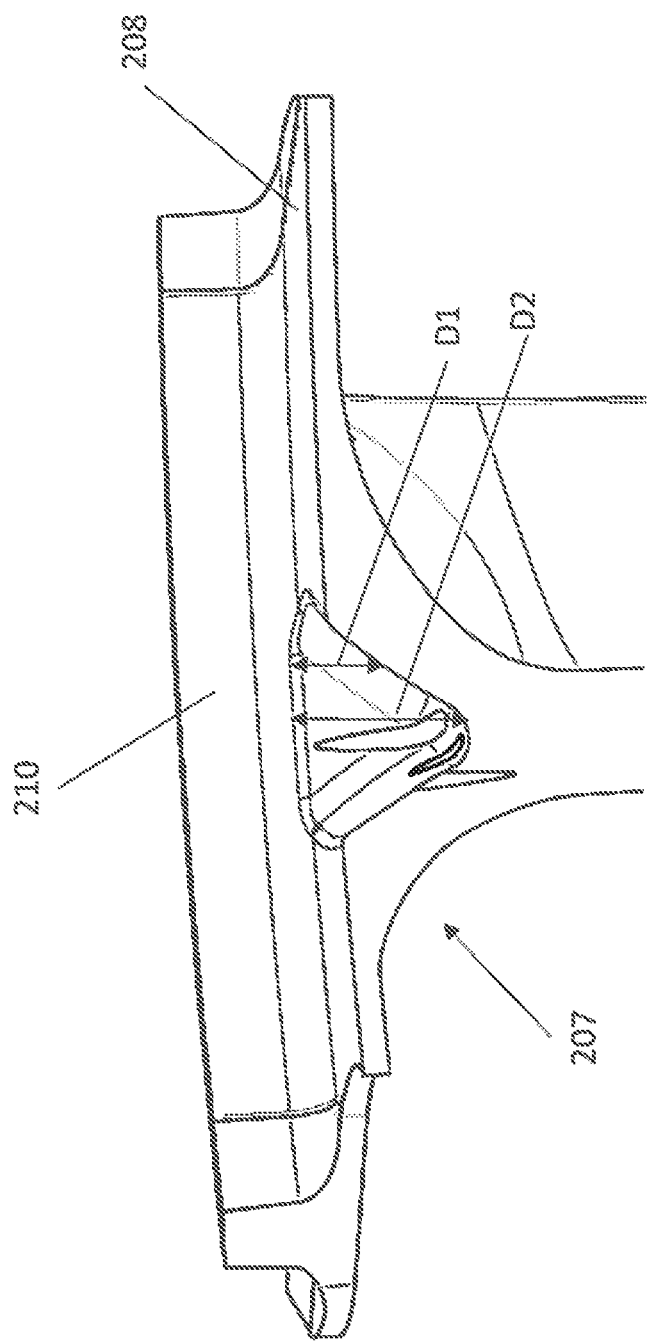
FIG. 6 is an alternate cross section view of the gas turbine blade of FIG. 4.

Referring to FIGS. 4-6, specific features of a representative pocket 216 are shown in greater detail. The specific size, shape, and location of the pocket 216 will vary depending on the amount of weight to be removed and the configuration of the turbine blade 200. More specifically, industrial gas turbine components used in power generation are larger than those used in aircraft engines. As such, these parts weigh more, but also have larger tip shrouds in which material may be able to be removed. Additionally, in the embodiment shown in FIGS. 4-6, the pocket 216 has a variable depth, where the depth of the pocket is deeper in areas where the shroud 208 interfaces with the airfoil 206, designated as 207 in FIG. 6, as this region may have additional material which can be removed without adversely impacting the turbine blade structural integrity. For example, and as shown more clearly in FIG. 6, a depth D2 of pocket 216 is greater than a depth D1. For the turbine blade 200 depicted in FIGS. 4-6, one such pocket 216 removes approximately 0.039 pounds from the shroud region of turbine blade 200, thereby helping to reduce the effect of the increased blade pull associated with adding an additional knife edge to the tip shroud. The change in blade weight through the one or more shroud pockets will vary based on the size and quantity of pockets compared to size of additional knife edge added to the tip shroud.

As discussed above, the pocket 216 can be a variety of shapes, and is preferably a non-uniform configuration adhering to the curvature and shape of the airfoil 206 and tip shroud 208. In one embodiment of the present disclosure, the one or more pockets 216 have an axial length greater than a circumferential width. In another embodiment, the dimensions of the pocket extending along a chord line of the airfoil is greater than other dimensions of the pocket 216, such that the pocket 216 extends primarily along the chord of airfoil 206.

Figure 7:
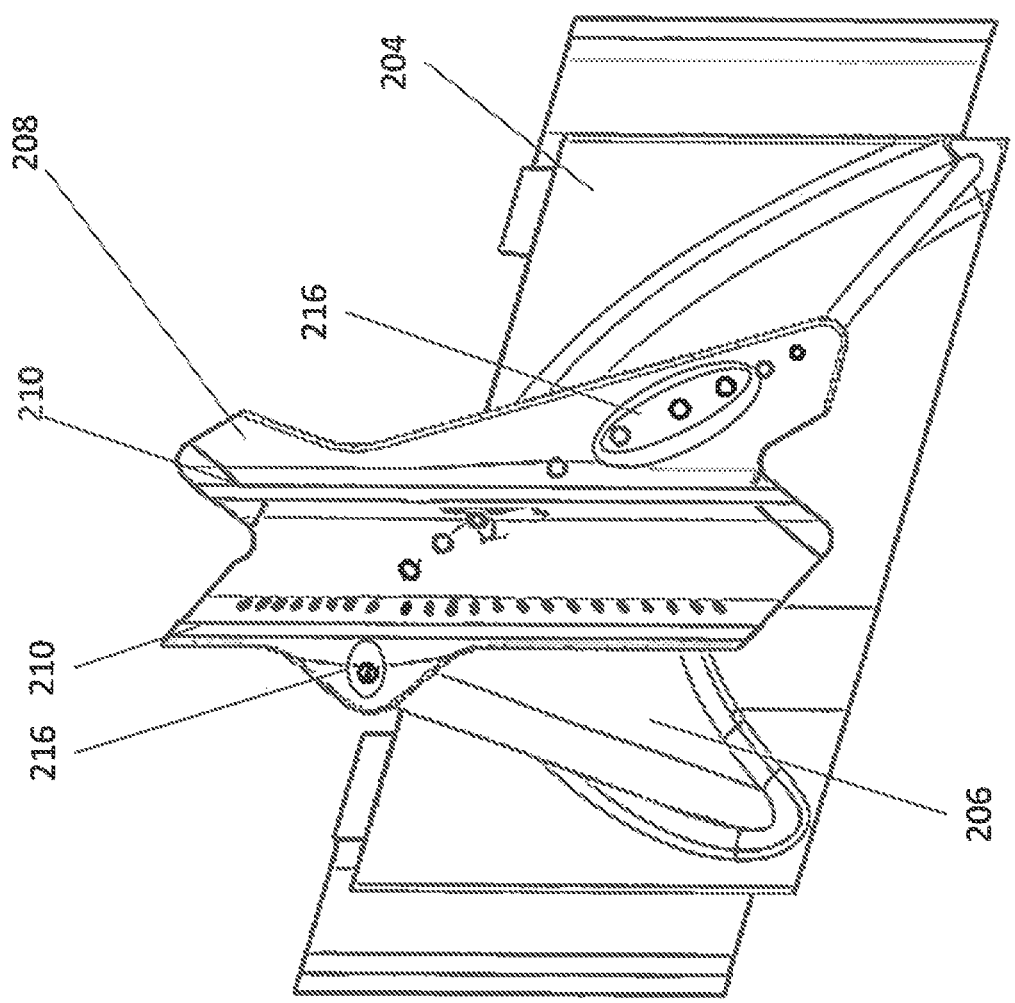
FIG. 7 is a top elevation view of a gas turbine blade in accordance with an alternate embodiment of the present disclosure.
Figure 8:
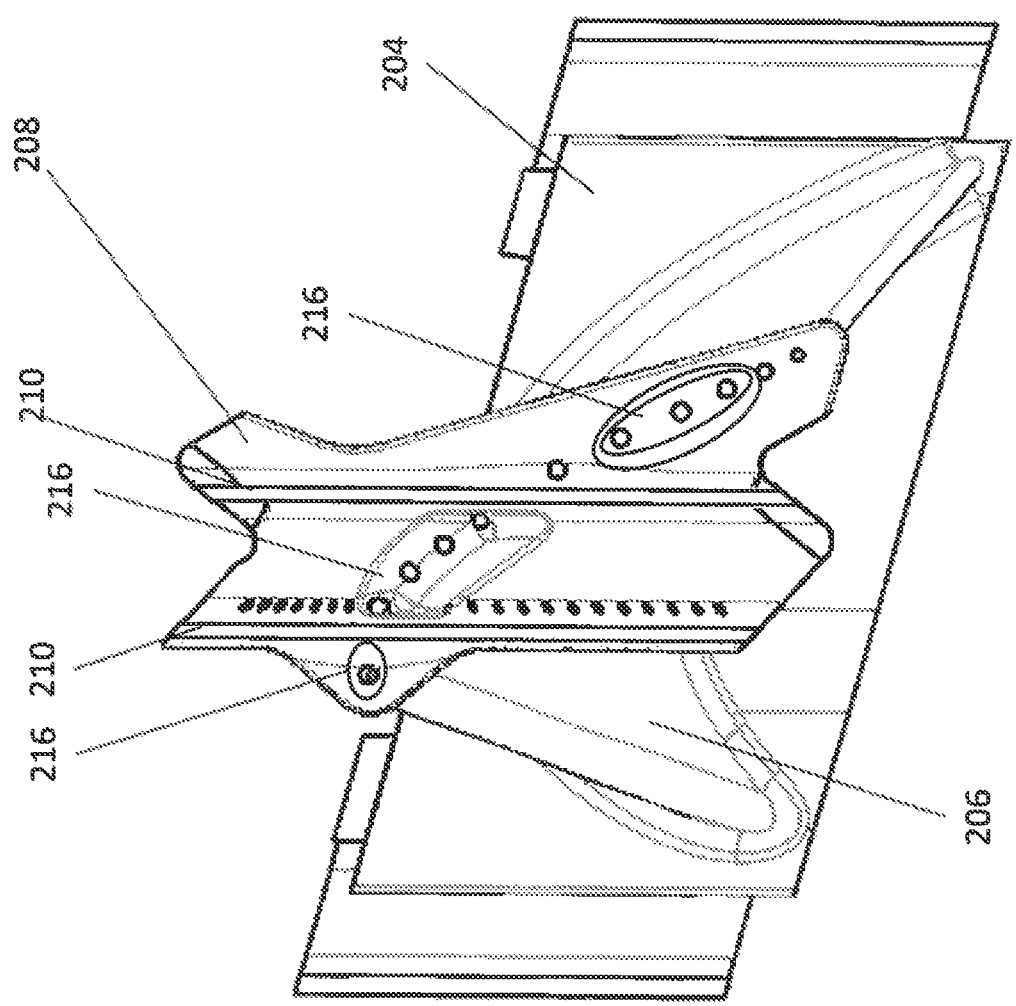
FIG. 8 is a top elevation view of a gas turbine blade in accordance with yet another embodiment of the present disclosure.

In the embodiment of the present disclosure depicted in FIGS. 3-6, one pocket 216 is positioned between two knife edges 210. However, present disclosure is not limited to placement of a single pocket 216 in the tip shroud 208. It is to be understood that the present disclosure also comprises using multiple tip pockets of varying sizes spread across the tip shroud 208. For example, the pocket 216 positioned between the knife edges 210 in FIGS. 3-6 could be comprised of multiple smaller pockets equaling the same volume and weight reduction as a single larger pocket. Alternatively, the one or more pockets 216 could be positioned on opposing and external sides of the knife edges 210 such that they are positioned closer to the leading edge and trailing edge of the airfoil 206. This alternate configuration is depicted in FIG. 7. Referring now to FIG. 8, another embodiment of the present disclosure is depicted in which the one or more pockets 216 are position both between and external to the knife edges 210.

The pocket 216 can be placed in the tip shroud 208 of a new turbine blade or a repaired/reconditioned blade. If the pocket 216 is to be incorporated into a new turbine blade, it can be incorporated into the blade casting or through a post-casting machining process. In order to incorporate the pocket 216 into a new casting, the wax die tool can be fabricated to incorporate the pocket 216 directly in the tool by including this feature in the initial tool machining. Alternatively, an existing wax die tool can be modified by placing an insert in the shape of the pocket 216 into the die tool, such that the insert creates a void in the blade wax pattern in the shape of the pocket 216. This void is carried into the casting process such that metal is not poured into the shape of the resulting pocket 216. Alternatively, the one or more pockets 216 can be incorporated into a repair of a turbine blade by machining the pocket into the shroud region of the blade. This machining is preferably accomplished by burning the shape of the pocket into the shroud by way of an EDM electrode or other similar machining process.

Referring again to FIGS. 3, 5, and 6, the one or more pockets 216 may also encompass one or more of the cooling passages 214 for a cooled turbine blade. Where the one or more pockets 216 encompass a cooling passage 214, the flow of cooling air passing therethrough has an outward flow component away from the radial direction of the cooling passage 214. That is, this geometry change causes the air flow to also move tangentially and circumferentially with respect to the blade axis, thus improving the cooling to the area adjacent the cooling passages 214.

Figure 3:
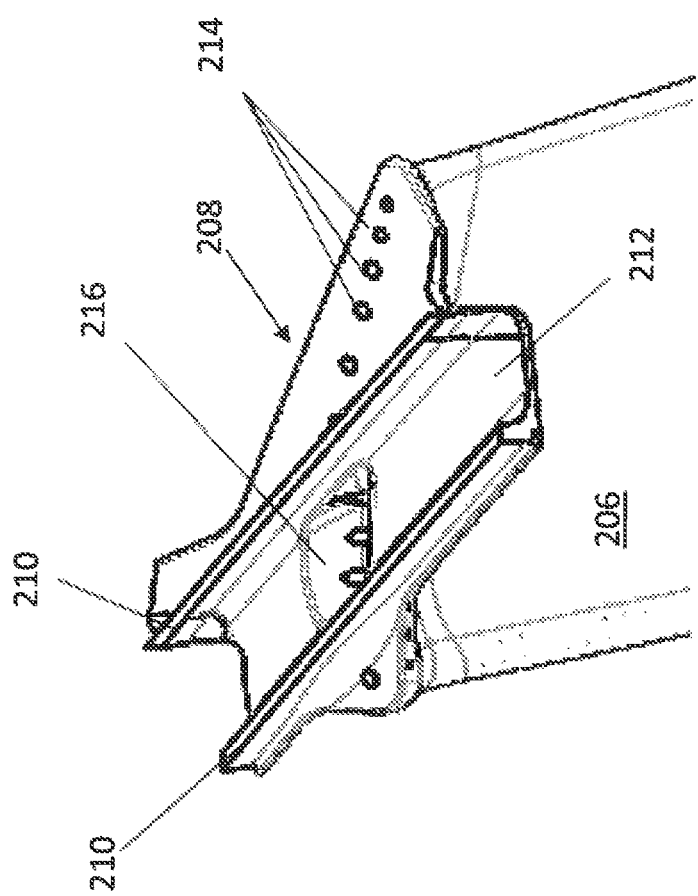
FIG. 3 is a detailed perspective view of a portion of the gas turbine blade of FIG. 2, in accordance with an embodiment of the present disclosure.

In an alternate embodiment of the disclosure, an existing turbine blade can be modified to improve sealing at a tip shroud and reduce airflow passing around a tip of the turbine blade by forming at least one additional knife edge extending radially outward from the tip shroud. This additional knife edge is formed in a subsequent manufacturing process. For example, some turbine blades have a single knife edge 210 extending radially outward from the shroud 208 for sealing adjacent a turbine shroud block. However, air can still bypass this single knife edge 210. In order to minimize leakage between a turbine blade and surrounding shroud, it is desirable to have multiple knife edges as depicted in FIGS. 2-4. However, a turbine blade having multiple knife edges also increases pull on the blade disk/attachment and shifts the blade center of gravity outward compared to a blade with a single knife edge due to the extra weight on the tip. To counteract the adverse effects of the additional weight and pull on the disk, a portion of the weight added to the shroud by the additional knife edge can be removed by adding the one or more pockets 216. The additional knife edge can be formed through a variety of manufacturing techniques, such as brazing a pre-fabricated strip onto the shroud or by an additive manufacturing process. The order in which manufacturing occurs for placing the one or more pockets 216 in the blade and adding an additional knife edge is a matter of preference depending on manufacturing techniques utilized.

Although a preferred embodiment of this disclosure has been disclosed, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for repairing a pre-casted turbine blade and improving sealing of a blade tip region comprising:
   providing the pre-casted turbine blade having an airfoil, a tip shroud, and a knife edge extending radially outward from the tip shroud;
   adding material to an outer surface of the tip shroud to form an additional knife edge; and,
   placing a pocket in at least a portion of the tip shroud;
   wherein:
      a weight of the pre-casted turbine blade is reduced after forming the additional knife edge and placing the pocket in the tip shroud; and
      a curvature and a shape of the pocket adheres to a curvature and a shape of each of the tip shroud and the airfoil.

2. The method of claim 1, wherein the pocket is placed in the tip shroud by an EDM process.

3. The method of claim 1, wherein the pocket extends into a portion of the airfoil.

4. The method of claim 1, wherein the pocket surrounds one or more cooling holes extending into the tip shroud.

5. The method of claim 4, wherein the pocket distributes cooling flow from the one or more cooling holes to the tip shroud.

6. The method of claim 1, wherein the second knife edge is added by brazing a strip of material to the outer surface of the tip shroud.

7. The method of claim 1, wherein the second knife edge is added by an additive manufacturing process.

8. A method of retrofitting a pre-cast turbine blade to reduce airflow passing around a tip of the turbine blade comprising:
   providing the pre-cast turbine blade having an airfoil, a tip shroud, and a knife edge extending radially outward from the tip shroud;
   forming at least one additional knife edge extending radially outward from the tip shroud of the pre-cast turbine blade, the at least one additional knife edge added to the tip shroud in a first subsequent manufacturing process; and
   forming at least one pocket in the tip shroud of the pre-cast turbine blade, the at least one pocket being formed in the tip shroud in a second subsequent manufacturing process;
   wherein:

a weight of the pre-cast turbine blade is reduced after forming the at least one additional knife edge and forming the at least one pocket in the tip shroud; and a curvature and a shape of the at least one pocket adheres to a curvature and a shape of the tip shroud.

9. The method of claim 8, wherein the at least one additional knife edge is added to the tip shroud by an additive manufacturing process.

10. The method of claim 8, wherein the at least one additional knife edge is added to the tip shroud by brazing material to an outer surface of the tip shroud.

11. A method of retrofitting a pre-cast turbine blade to reduce airflow passing around a tip of the turbine blade comprising:

providing the pre-cast turbine blade having an airfoil, a tip shroud, and a knife edge extending radially outward from the tip shroud;

forming at least one additional knife edge extending radially outward from the tip shroud of the pre-cast turbine blade, the at least one additional knife edge added to the tip shroud in a first subsequent manufacturing process; and forming at least one pocket in the tip shroud of the pre-cast turbine blade, the at least one pocket being formed in the tip shroud in a second subsequent manufacturing process;

wherein, a curvature and a shape of the at least one pocket adheres to a curvature and a shape of the tip shroud.

12. The method of claim 11, wherein the at least one pocket is between the knife edge and the at least one additional knife edge.

13. The method of claim 11, wherein the at least one pocket distributes cooling flow from a cooling hole to the tip shroud.

* * * * *